US012732897B2

(12) United States Patent
Li et al.

(10) Patent No.: US 12,732,897 B2
(45) Date of Patent: Sep. 8, 2026

(54) SEARCH SPACE GROUP SWITCHING METHOD AND APPARATUS

(71) Applicant: VIVO MOBILE COMMUNICATION CO., LTD., Guangdong (CN)

(72) Inventors: Dongru Li, Guangdong (CN); Na Li, Guangdong (CN); Xiaodong Shen, Guangdong (CN); Kai Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 564 days.

(21) Appl. No.: 18/344,982

(22) Filed: Jun. 30, 2023

(65) Prior Publication Data

US 2023/0354164 A1 Nov. 2, 2023

Related U.S. Application Data

(63) Continuation of application No. PCT/CN2021/143593, filed on Dec. 31, 2021.

(30) Foreign Application Priority Data

Jan. 4, 2021 (CN) ......................... 202110004990.6

(51) Int. Cl.
*H04W 48/12* (2009.01)
*H04W 52/02* (2009.01)

(52) U.S. Cl.
CPC ....... *H04W 48/12* (2013.01); *H04W 52/0212* (2013.01)

(58) Field of Classification Search
CPC ............. H04W 48/12; H04W 52/0212; H04W 52/0216; H04W 72/04; H04W 72/046;
(Continued)

(56) References Cited

U.S. PATENT DOCUMENTS 11,431,463 B2 * 8/2022 Ang ...................... H04L 5/0091
11,457,458 B2 * 9/2022 Kim ...................... H04W 72/23
(Continued)

FOREIGN PATENT DOCUMENTS

CN 110313210 A 10/2019
CN 111314035 A 6/2020
(Continued)

OTHER PUBLICATIONS

Lai et al. U.S. Provisional Patent Application U.S. Appl. No. 63/104,457, filed Oct. 22, 2020 (Year: 2020).*
(Continued)

*Primary Examiner* — Wutchung Chu
(74) *Attorney, Agent, or Firm* — Price Heneveld LLP

(57) ABSTRACT

Embodiments of this application disclose a search space group switching method and apparatus. The method can be applied to a terminal and includes switching between at least two search space groups, and performing corresponding physical downlink control channel PDCCH monitoring based on a switched-to search space group, where the at least two search space groups include search space group #2, search space group #2 being not linked to any search space or a first search space, the first search space including at least one of a first type common search space CSS, a UE specific search space USS, and a CSS other than the first type CSS.

20 Claims, 3 Drawing Sheets

200

Switch between at least two search space groups — S202

Perform corresponding PDCCH monitoring based on a switched-to search space group, where the at least two search space groups include search space group #2, and search space group #2 is not linked to any search space or a first search space — S204

(58) Field of Classification Search
CPC ............... H04W 72/23; H04W 72/232; H04W 72/0446; H04W 72/53; H04W 76/28; H04W 52/0229; H04W 52/028; H04W 72/0457; H04W 72/231; H04W 72/0453; H04L 5/001; H04L 5/0053; H04L 5/0091; H04L 5/0096; H04L 27/26025; H04L 5/0092; H04L 5/0098; H04L 5/0048; H04L 5/0055; H04L 1/1861; H04L 5/0035; H04L 5/0078; H04L 1/0023; H04L 5/005; H04L 5/0051; Y02D 30/70
See application file for complete search history.

(56) References Cited

U.S. PATENT DOCUMENTS

| | | | | |
|---|---|---|---|---|
| 11,943,759 | B2* | 3/2024 | Kim | H04W 72/0453 |
| 2013/0010720 | A1 | 1/2013 | Lohr et al. | |
| 2015/0230215 | A1 | 8/2015 | Ye et al. | |
| 2019/0082427 | A1* | 3/2019 | Kim | H04L 5/0051 |
| 2019/0089486 | A1* | 3/2019 | Kim | H04L 1/0041 |
| 2019/0342777 | A1 | 11/2019 | Tiirola et al. | |
| 2020/0314898 | A1* | 10/2020 | Sun | H04W 72/23 |
| 2021/0051658 | A1* | 2/2021 | Park | H04W 56/001 |
| 2021/0337471 | A1* | 10/2021 | Hu | H04W 68/02 |
| 2022/0174651 | A1* | 6/2022 | Seo | H04W 52/0216 |
| 2022/0200777 | A1* | 6/2022 | Lee | H04L 5/1461 |
| 2022/0217694 | A1* | 7/2022 | Kim | H04L 1/1864 |
| 2022/0338120 | A1* | 10/2022 | Ma | H04W 72/23 |
| 2023/0156572 | A1* | 5/2023 | Reial | H04W 52/0216<br>370/329 |
| 2023/0284141 | A1* | 9/2023 | Li | H04W 52/0225<br>370/311 |
| 2023/0319845 | A1* | 10/2023 | Guo | H04W 72/1273<br>370/329 |
| 2023/0397224 | A1* | 12/2023 | Lai | H04W 52/0229 |
| 2023/0422310 | A1* | 12/2023 | Kim | H04W 72/0453 |
| 2024/0106566 | A1* | 3/2024 | Park | H04L 5/0094 |

FOREIGN PATENT DOCUMENTS

| | | | | |
|---|---|---|---|---|
| CN | 111837431 | A | 10/2020 | |
| EP | 3952474 | B1 * | 3/2024 | H04L 5/0053 |
| JP | 2013520052 | A | 5/2013 | |
| WO | 2020042783 | A1 | 3/2020 | |
| WO | 2020204484 | A1 | 10/2020 | |
| WO | WO-2022012440 | A1 * | 1/2022 | H04W 72/12 |
| WO | WO-2022027618 | A1 * | 2/2022 | H04W 72/23 |

OTHER PUBLICATIONS

Research in Motion, UK Limited, Support Common Control Channel in E-PDCCH, 3GPP TSG RAN WG1 Meeting #68bis, R1-121479, Mar. 26-30, 2012, Jeju, Korea.

Asia Pacific Telecom, Discussion on extension(s) to Rel-16 DCI-based power saving adaptation, 3GPP TSG-RAN WG1 #103-e, R1-2009056, e-Meeting, Oct. 26-Nov. 13, 2020.

Samsung, "Search Space Design", 3GPP TSG RAN WG1 Meeting #90, R1-1713613, Prague, Czechia, Aug. 21-25, 2017.

Lenovo, "Summary of email Discussion [100b-e-NR-unlic-NRU-DL_Signals_and_Channels-01] on SS group sets", 3GPP TSG RAN WG1#100bis-e, R1-2002786, e-Meeting, Apr. 20-30, 2020.

Ericsson, "Discussion on potential enhancements for power savings during active", 3GPP TSG RAN WG1 #102, Tdoc R1-2006668, e-Meeting, Aug. 18-28, 2020.

"3rd Generation Partnership Project; Technical Specification Group Radio Access Network; NR; Multiplexing and channel coding (Release 16)", 3GPP TS 38.212 V16.3.0 (Sep. 2020), Valbonne, France.

Second Chinese Office Action for Chinese Application No. 202110004990.6 mailed Jul. 18, 2025, 13 pages,.

Huawei, Hisilicon, "[H226] TP for search space group switching for CSS", 3GPP TSG-RAN WG2 Meeting #109bis-e, R2-2003638, Electronic, Apr. 20-May 1, 2020.

Vivo, "Correction to the search space switching timer", 3GPP TSG-RAN WG2 Meeting #111-e, R2-2008065, E-meeting, Aug 17-Aug. 28, 2020.

* cited by examiner

SEARCH SPACE GROUP SWITCHING METHOD AND APPARATUS

CROSS-REFERENCE TO RELATED APPLICATIONS

The present application is a continuation application of PCT International Application No. PCT/CN2021/143593 filed on Dec. 31, 2021, which claims priority to Chinese Patent Application No. 202110004990.6, filed with the China National Intellectual Property Administration on Jan. 4, 2021 and entitled "SEARCH SPACE GROUP SWITCHING METHOD AND APPARATUS", which are incorporated herein by reference in their entireties.

TECHNICAL FIELD

This application pertains to the field of communication technologies and specifically relates to a search space group switching method and apparatus. The device may include a search space group switching apparatus and a terminal.

BACKGROUND

In a communication system, two search space groups (SS group) are introduced. A type 3 physical downlink control channel common search space set (Type3-PDCCH CSS set) or a UE specific search space (USS) set can be linked to these two search space groups, while the other Type0/0A/1/2 common search space sets that are not part of the above search space groups need to be monitored continuously by terminals. Currently, switching between two SS groups has limited PDCCH monitoring effects and therefore is not conducive to energy saving for terminals.

SUMMARY

According to a first aspect, a search space group switching method is provided and applied to a terminal. The method includes: switching between at least two search space groups; and performing corresponding physical downlink control channel PDCCH monitoring based on a switched-to search space group; where the at least two search space groups include search space group #2, search space group #2 being not linked to any search space or a first search space, the first search space including at least one of a first type common search space CSS, a UE specific search space USS, and a CSS other than the first type CSS.

According to a second aspect, a search space group switching apparatus is provided, including: a switching module configured to switch between at least two search space groups; and a PDCCH monitoring module configured to perform corresponding PDCCH monitoring based on a switched-to search space group; where the at least two search space groups include search space group #2, search space group #2 being not linked to any search space or a first search space, the first search space including at least one of a first type common search space CSS, a UE specific search space USS, and a CSS other than the first type CSS.

According to a third aspect, a terminal is provided. The terminal includes a processor, a memory, and a program or instructions stored in the memory and capable of running on the processor, where when the program or instructions are executed by the processor, the method according to the first aspect is implemented.

According to a fourth aspect, a readable storage medium is provided. The readable storage medium stores a program or instructions, and when the program or instructions are executed by a processor, the method according to the first aspect is implemented.

According to a fifth aspect, a computer program product is provided. The computer program product includes a processor, a memory, and a program or instructions stored in the memory and capable of running on the processor, and when the program or instructions are executed by the processor, the method according to the first aspect is implemented.

According to a sixth aspect, a chip is provided. The chip includes a processor and a communications interface. The communications interface is coupled to the processor, and the processor is configured to run a program or instructions to implement the method according to the first aspect.

DETAILED DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in the specification and claims of this application are used to distinguish between similar objects rather than to describe a specific order or sequence. It should be understood that terms used in this way are interchangeable in appropriate circumstances so that the embodiments of this application can be implemented in other orders than the order illustrated or described herein. In addition, "first" and "second" are usually used to distinguish objects of a same type and do not limit the quantity of objects. For example, there may be one or a plurality of first objects. In addition, in this specification and claims, "and/or" indicates at least one of the connected objects, and the character "/" generally indicates an "or" relationship between the contextually associated objects.

It should be noted that the technologies described in the embodiments of this application are not limited to long term evolution (LTE)/LTE-Advanced (LTE-A) systems, but may also be used in other wireless communications systems such as code division multiple access (CDMA), time division multiple access (TDMA), frequency division multiple access (FDMA), orthogonal frequency division multiple access (OFDMA), single-carrier frequency division multiple access (SC-FDMA), and other systems. The terms "system" and "network" in the embodiments of this application are often used interchangeably, and the technology described herein may be used in the above-mentioned systems and radio technologies as well as other systems and radio technologies. In the following descriptions, the new radio (NR) system is described for an illustration purpose, and NR terms are used in most of the following descriptions, although these technologies may also be used in applications other than the NR system, for example, the 6th generation (6G) communication system.

Figure 1:
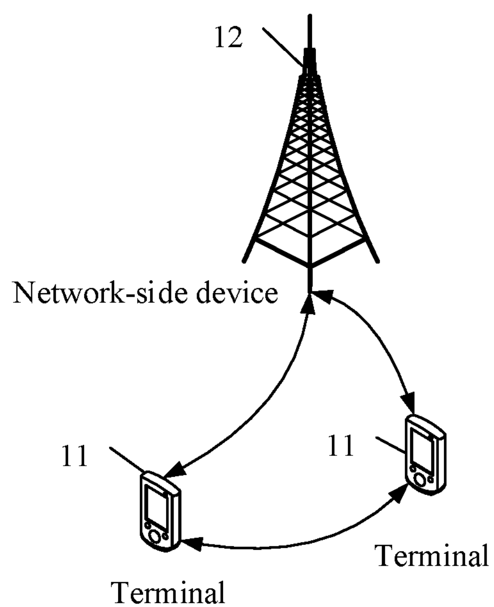
FIG. 1 is a schematic diagram of a wireless communications system according to an embodiment of this application.

FIG. 1 is a schematic diagram of a wireless communications system to which an embodiment of this application may be applied. The wireless communications system includes a terminal 11 and a network-side device 12. The terminal 11 may also be referred to as a terminal device or user equipment (UE). The terminal 11 may be a terminal-side device, such as a mobile phone, a tablet personal computer, a laptop computer or notebook computer, a personal digital assistant (PDA), a palmtop computer, a netbook, an ultra-mobile personal computer (UMPC), a mobile internet device (MID), a wearable device, vehicular user equipment (VUE), or pedestrian user equipment (PUE). The wearable device includes a wrist band, earphones, glasses, and the like. It should be noted that the terminal 11 is not limited to any particular type in the embodiments of this application. The network-side device 12 may be a base station or a core network, where the base station may be referred to as an access point, a base transceiver station (BTS), a radio base station, a radio transceiver, a basic service set (BSS), an extended service set (ESS), a NodeB, an evolved NodeB (eNB), a next-generation NodeB (gNB), a home NodeB, a home evolved NodeB, a wireless local area network (WLAN) access point, a Wi-Fi node, a transmission reception point (TRP) or other appropriate terms in the art. Provided that the same technical effects are achieved, the base station is not limited to any particular technical terms. It should be noted that in the embodiments of this application, only the base station in the NR system is used as an example, but the base station is not limited in type.

The following details the search space group switching method and apparatus provided in the embodiments of this application through specific embodiments and application scenarios thereof with reference to the accompanying drawings.

Figure 2:
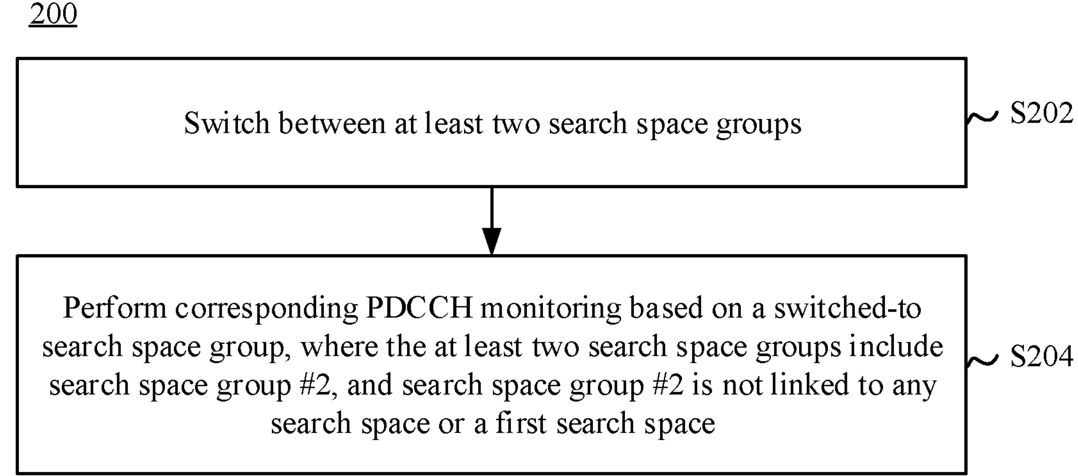
FIG. 2 is a schematic flowchart of a search space group switching method according to an embodiment of this application.

As shown in FIG. 2, an embodiment of this application provides a search space group switching method 200. The method may be executed by a terminal. In other words, the method may be executed by software or hardware installed on the terminal. The method includes the following steps.

S202: Switch between at least two search space groups.

In some embodiments, before S202, the terminal may also receive configuration information from a network-side device, and the configuration information is used to configure the above at least two search space groups for the terminal.

In this embodiment, the terminal can switch between the at least two search space groups based on trigger mechanisms such as reception of downlink control information (DCI) indications, obtaining of network-side device configurations, and changes in the status of timers.

S204: Perform corresponding physical downlink control channel (PDCCH) monitoring based on a switched-to search space group, where the at least two search space groups include search space group #2, search space group #2 being not linked to any search space or not linked to a first search space.

The above first search space includes at least one of a first type common search space (CSS), a UE specific search space (USS), and a CSS other than the first type CSSs. For example, the first search space includes the first type CSS; the first search space includes the first type CSS and the USS; the first search space includes the USS and the CSS other than the first type CSS; and the first search space includes the first type CSS and the CSS other than the first type CSS, that is, the first search space includes all types of CSSs.

In some embodiments, the above first type CSS may be a type 3 CSS.

It can be understood that in the case that search space group #2 is not linked to any search space, the terminal switching to search space group #2 can implement PDCCH skipping, thereby implementing terminal energy saving. In the case that search space group #2 is not linked to the first search space and that the terminal switches to search space group #2, the terminal at least does not need to monitor the first search space, also facilitating terminal energy saving.

It should be noted that PDCCH skipping refers to skipping PDCCH monitoring that is not performed in Type0/0A/1/2 CSSs.

The at least two search space groups mentioned in the embodiments of this application may include at least one of the following (1) and (2) in addition to search space group #2:

(1) Search Space Group #0.

In one embodiment, search space group #0 is linked to a search space with sparse physical downlink control channel (PDCCH) monitoring period. The terminal switching to search space group #0 can reduce PDCCH monitoring and facilitate terminal energy saving, but scheduling delay may increase relatively.

(2) Search Space Group #1.

In one embodiment, search space group #1 is linked to a search space with dense PDCCH monitoring period. The terminal switching to search space group #1 can reduce scheduling delay, but terminal power consumption may increase relatively.

In some embodiments, a network-side configuration or a protocol stipulates that search space group #0 or search space group #1 is a default search space group.

It should be noted that the embodiments of this application do not limit the search spaces linked to search space group #0 and search space group #1.

In the search space group switching method provided in this embodiment of this application, introducing search space group #2 can implement more flexible and diverse PDCCH monitoring. In the case that search space group #2 is not linked to any search space, the terminal switching to search space group #2 can implement PDCCH skipping, thereby achieving the purpose of terminal energy saving. In the case that search space group #2 is not linked to the first search space and that the terminal switches to search space group #2, at least the first search space does not need to be monitored, also facilitating terminal energy saving.

Multiple embodiments will be presented to provide a detailed description of the method of switching (or transforming) between the three search space groups mentioned above.

Solution 1

The at least two search space groups mentioned in embodiment 200 include search space group #0 and/or search space group #1. In this way, the terminal's switching between at least two search space groups in S202 includes at least one of the following: (1) switching from search space group #0 to search space group #1; and (2) switching from search space group #0 to search space group #2.

In solution 1, the terminal can perform the above search space group switching process of (1) or (2) according to indication of first downlink control information (DCI).

It should be noted that in this embodiment, switching from search space group #1 to search space group #2 can be understood as switching from search space group #1 to search space group #2 in the case that the terminal is using search space group #1 currently. This is also the case in the following examples and will not be repeated.

In this example, the terminal's switching between at least two search space groups includes at least one of the following: (1) in a case that the terminal is using search space group #0 and that an obtained first indication is a first value, switching from search space group #0 to search space group #1; and (2) in a case that the terminal is using search space group #0 and that an obtained first indication is a second value, switching from search space group #0 to search space group #2; where the first indication is carried in the first DCI.

In this example, the first DCI may be data scheduling DCI or non-data scheduling DCI.

For example, the first DCI is in a DCI format 1-1. In the DCI format 1-1, the first indication is added for indication of switching from search space group #0 to search space group #1 or from search space group #0 to search space group #2. The first indication may occupy 1 bit. The first indication being "0" indicates switching from search space group #0 to search space group #1; the first indication being "1" indicates switching from search space group #0 to search space group #2.

The first indication is added in the above example to indicate the search space group switching process of (1) and (2). In addition, by combining with an existing indication field in the DCI (for example, an indication field with another function or reserved indication field in the DCI), a second indication may be used to indicate the function of the existing indication field, so as to indicate the above search space group switching (1) and (2).

For example, the first DCI mentioned in the above example may further include a second indication, and the second indication meets at least one of the following: (1) a preset indication field being used for the first indication in a case that the second indication obtained is a third value; and (2) a preset indication field being used for a preset indication in a case that the second indication obtained is a fourth value.

In this embodiment, an indication field function reusing indication (that is, the second indication) is added to the first DCI. The indication field function reusing indication is used to determine what function the preset indication field is used for. In some embodiments, for example, the second indication added to the first DCI is of 1 bit, and the preset indication field is a minimum available scheduling offset indication field in the DCI format 1-1. The second indication being '0' indicates that the minimum available scheduling offset indication field (that is, the preset indication field) is used for a minimum available scheduling offset indication; and the second indication being '1' indicates that the minimum available scheduling offset indication field is used for indication of the above search space group switching (1) and (2), that is, used as the first indication.

In solution 1, indication of the above search space group switching (1) and (2) may alternatively be bound to a third indication field in the first DCI. The third indication field may be: minimum available scheduling offset indication, PDCCH skipping indication, bandwidth part (BWP) switching indication, and the like.

In this example, the terminal's switching between at least two search space groups includes at least one of the following: (1) in a case that the terminal is using search space group #0 and that a minimum available scheduling offset indicated by an obtained minimum available scheduling offset indication is equal to 0, switching from search space group #0 to search space group #1; and (2) in a case that the terminal is using search space group #0 and that a minimum available scheduling offset indicated by an obtained minimum available scheduling offset indication is greater than 0, switching from search space group #0 to search space group #2.

This example reduces signaling resource overheads by using a binding indication method, without adding an indication field to the first DCI.

Solution 2

Solution 1 mainly describes how the terminal determines switch from search space group #0 to search space group #1 or from search space group #0 to search space group #2. Solution 2 mainly describes how the terminal switches from search space group #2 to search space group #0 or from search space group #2 to a default search space group, where the default search space group is any one of the at least two search space groups.

The at least two search space groups mentioned in embodiment 200 further include search space group #0. In this way, the terminal's switching between at least two search space groups in S202 includes: switching from search space group #2 to search space group #0 or from search space group #2 to a default search space group.

In solution 2, the terminal may switch between the above search space groups based on a first timer.

In this example, the terminal's switching from search space group #2 to search space group #0 includes: in the case that the terminal is using search space group #2, switching from search space group #2 to search space group #0 or from search space group #2 to the default search space group after the first timer times out (or expires) or a first time interval has elapsed since the first timer times out. For example, in a case that the terminal is using search space group #2, the terminal performs the step of switching from search space group #2 to search space group #0 after the first timer times out. For another example, in a case that the terminal is using search space group #2, the terminal performs the step of switching from search space group #2 to search space group #0 3 ms after the first timer times out. The first timer is used for switching from search space group #2 to search space group #0 or from search space group #2 to the default search space group.

In addition, in this embodiment, when the terminal switches from another search space group (such as #0 or #1) to search space group #2, the first timer is started or restarted. After the first timer times out (expires) or after the first time interval has elapsed since the first timer times out, the terminal switches from search space group #2 to (falls back to) search space group #0. In this case, the network side configures search space group #0 as the default search space group. The first timer is used for switching from search space group #2 to search space group #0 or from search space group #2 to the default search space group. The default search space group in this embodiment may be any one of the at least two search space groups mentioned in embodiment 200.

In some embodiments, the counting unit of the first timer may be: time slot, millisecond, discontinuous reception (DRX) cycle, or the like.

In solution 2, the terminal may further perform search space group switching based on detected second DCI.

In this example, the terminal's switching between at least two search space groups includes: in the case that the terminal is using search space group #2 and that second DCI is received or detected, switching from search space group #2 to search space group #0 or from search space group #2 to the default search space group.

In some embodiments, the second DCI may be scrambled with a specific radio network temporary identity (RNTI); and/or a search space carrying the second DCI is a specific type of search space. In some embodiments, for example, the second DCI is scrambled with a cell radio network temporary identity (C-RNTI); and for another example, the type of the search space carrying the second DCI is CSS.

For example, the terminal is currently using search space group #2 and search space group #2 is not linked to any search space. When the terminal detects DCI format 1-0 scrambled with C-RNTI in a PDCCH monitoring occasion of type 3 CSS, the terminal switches from search space group #2 to the default search space group. For example, if the default search space group configured by the network is search space group #0, the terminal switches from search space group #2 to search space group #0.

The above two examples of solution 2 mainly describe the terminal's switching between search space groups based on the first timer and whether the second DCI is detected. In other embodiments, in a case that the terminal is using search space group #2 and that third DCI is detected, the terminal continues using search space group #2, that is, the terminal does not perform search space group switching.

In some embodiments, the third DCI may be scrambled with a group common RNTI or a broadcast RNTI. In some embodiments, for example, the third DCI may be scrambled with a slot format indication SFI-RNTI, power saving PS-RNTI, paging P-RNTI, RA-RNTI, or the like.

In this embodiment, the terminal may further start or restart the first timer after detecting the third DCI. The function of the first timer can be seen in the previous section, which is used for the terminal's switching from search space group #2 to search space group #0 or default search space group. The counting unit of the first timer may be: time slot, millisecond, or DRX cycle. The default search space group in this embodiment may be any one of the at least two search space groups mentioned in embodiment 200.

In some embodiments, in solution 1 and solution 2, the terminal may not support direct switching between search space group #1 and search space group #2. For example, a network-side configuration or a protocol stipulates that the terminal does not support direct switching between search space group #2 and search space group #1. Direct switching refers to switching from search space group #1 to search space group #2 or from search space group #2 to search space group #1.

This embodiment can utilize the existing search space group switching mechanism to the greatest extent, achieve terminal energy saving by switching to search space group #2 to implement PDCCH skipping, and save signaling overheads compared to solution 3 to be described below.

Solution 3

In solution 3, the terminal supports switching between any two of the default search space group, search space group #0, search space group #1, and search space group #2, achieving flexible search space group switching and achieving different PDCCH monitoring effects.

The at least two search space groups mentioned in embodiment 200 further include search space group #0 and/or search space group #1. In this way, the terminal's switching between at least two search space groups in S202 includes at least one of the following: (1) switching from search space group #2 to search space group #0; (2) switching from search space group #2 to search space group #1; and (3) switching from search space group #2 to the default search space group, where the default search space group is any one of the at least two search space groups.

In solution 3, the terminal may switch between the above search space groups based on a first timer.

In this example, the terminal's switching from search space group #2 to search space group #0 or from search space group #2 to the default search space group includes: in the case that the terminal is using search space group #2, after the first timer times out (expires) or after a first time interval has elapsed since the first timer times out, switching from search space group #2 to search space group #0 or from search space group #2 to the default search space group. The default search space group in this embodiment may be any one of the at least two search space groups mentioned in embodiment 200.

In addition, in this embodiment, when the terminal switches from another search space group (such as #0 or #1) to search space group #2, the first timer is started or restarted. After the first timer times out (expires) or after the first time interval has elapsed since the first timer times out, the terminal switches from search space group #2 to (falls back to) search space group #0. In this case, the network side configures search space group #0 as the default search space group. The first timer is used for switching from search space group #2 to search space group #0 or from search space group #2 to the default search space group.

In some embodiments, the counting unit of the first timer may be: time slot, millisecond, DRX cycle, or the like.

In solution 3, the terminal may further perform search space group switching based on detected second DCI.

In this example, the terminal's switching between at least two search space groups includes: in the case that the terminal is using search space group #2, if second DCI is received or detected, performing at least one of the following: (1) switching from search space group #2 to search space group #0; (2) switching from search space group #2 to search space group #1; and (3) switching from search space group #2 to the default search space group.

In this embodiment, the terminal may further determine, based on at least one of a network-side device configuration, a predefined rule (for example a protocol agreement), and the second DCI, to switch from search space group #2 to search space group #0 or from search space group #2 to search space group #1 or from search space group #2 to the default search space group.

For example, a radio resource control (RRC) configuration indicates that in a case that the terminal is using search space group #2, in a case that second DCI is received (detected), the terminal switches from search space group #2 to search space group #1. For another example, in a case that the second DCI indicates that when the terminal is using search space group #2, the terminal switches from search space group #2 to any one of search space group #1, the default search space group, or search space group #0.

In some embodiments, the second DCI is scrambled with a specific RNTI; and/or a search space carrying the second DCI is a specific type of search space. In some embodiments, for example, the second DCI is scrambled with a C-RNTI. For another example, the type of the search space carrying the second DCI is CSS.

For example, the terminal is currently using search space group #2 and search space group #2 is not linked to any search space. When the terminal detects DCI format 1-0 scrambled with C-RNTI in a PDCCH monitoring occasion of type 3 CSS, the terminal switches from search space group #2 to the default search space group. For example, if the default search space group configured by the network is search space group #0, the terminal switches from search space group #2 to search space group #0.

The above two examples of solution 3 mainly describe the terminal's switching between search space groups based on the first timer and whether the second DCI is detected. In other embodiments, in a case that the terminal is using search space group #2, if third DCI is detected, the terminal continues using search space group #2, that is, the terminal does not perform search space group switching.

In some embodiments, the third DCI is scrambled with a group common RNTI or a broadcast RNTI. In some embodiments, for example, the third DCI is scrambled with a slot format indication SFI-RNTI, power saving PS-RNTI, paging P-RNTI, RA-RNTI, or the like.

In this embodiment, the terminal may further start or restart the first timer after detecting the third DCI. The function of the first timer can be seen in the previous section, which is used for the terminal's switching from search space group #2 to search space group #0 or from search space group #2 to the default search space group. The counting unit of the first timer may be: time slot, millisecond, or DRX cycle.

The above examples of solution 3 mainly describe how the terminal switches from search space group #2 to search space group #1, the default search space group, or search space group #0. As to how the terminal switches from search space group #1 or search space group #0 to search space group #2, refer to the embodiments of solution 1 to solution 3 described in the previous section. For example, the terminal switches from search space group #1 or search space group #0 to search space group #2 based on a DCI indication. For another example, no DCI is detected during the operation of the timer, and the terminal switches from search space group #1 or search space group #0 to search space group #2 after the timer times out.

Solution 4

In this solution, the terminal's switching between the at least two search space groups includes: switching a search space group of a target cell group between the at least two search space groups based on target information; where the target information includes at least one of the following: a secondary cell dormancy or non-dormancy indication, and a secondary cell activation or deactivation indication; and the target cell group is a cell group other than a cell group to which a cell indicated by the target information belongs. This solution is applicable to scenarios where the network-side device has configured carrier aggregation for multiple serving cells. Cell groups can be configured by the network-side device, for example, a cell group is equivalent to a dormant secondary cell group.

In the first example, the at least two search space groups further include search space group #0 and/or search space group #1; and in the case that the target information includes a secondary cell non-dormancy indication or a secondary cell activation indication, the switching a search space group of a target cell group between the at least two search space groups based on target information includes at least one of the following: (1) switching a search space group of a cell group that is in the target cell group and that is using search space group #2 to search space group #0 or search space group #1; and (2) switching a search space group of a cell group that is in the target cell group and that is using search space group #0 to search space group #1.

In the second example, the at least two search space groups further include search space group #0 and/or search space group #1 and in a case that the target information includes a secondary cell dormancy indication or a secondary cell deactivation indication, the switching a search space group of a target cell group between the at least two search space groups based on target information includes at least one of the following: (1) switching a search space group of a cell group that is in the target cell group and that is using search space group #1 to search space group #0 or search space group #2; and (2) switching a search space group of a cell group that is in the target cell group and that is using search space group #0 to search space group #2.

In some embodiments, in this embodiment, after switching to search space group #2 is completed, a first timer may be started or restarted. The first timer is used for switching from search space group #2 to search space group #0 or from search space group #2 to a default search space group. The default search space group in this embodiment may be any one of the at least two search space groups mentioned in embodiment 200.

It should be noted that the first timers mentioned in the embodiments of this specification may be the same timer.

In the second example, the switching a search space group of a target cell group between the at least two search space groups based on target information includes: in a case that no DCI is detected during the operation of the second timer, switching the search space group of the target cell group between the at least two search space groups based on the target information.

For example, in a case that the terminal receives a secondary cell dormancy indication or a secondary cell deactivation indication, the second timer is started or restarted. In a case that no DCI is detected during the operation of the second timer, the search space group of the target cell group switches between the at least two search space groups after the second timer times out according to the description of the second example above.

It should be noted that the search space group switching method provided in this embodiment of this application can be executed by a search space group switching apparatus or a control module in the search space group switching apparatus for executing the search space group switching method. A search space group switching apparatus performing the search space group switching method is used as an example in the embodiments of this application to describe the search space group switching apparatus provided in the embodiments of this application.

Figure 3:
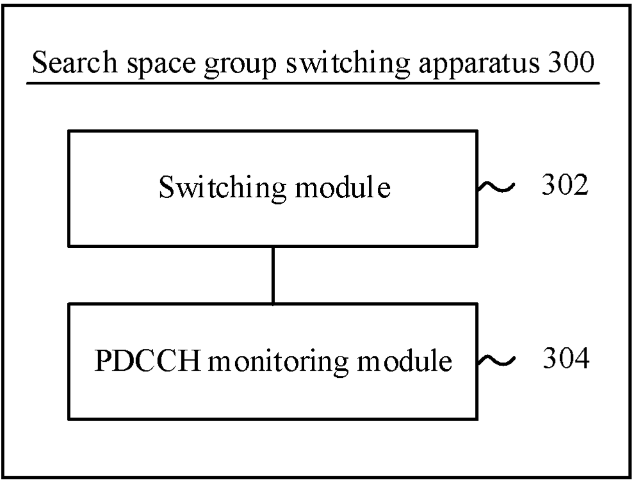
FIG. 3 is a schematic structural diagram of a search space group switching apparatus according to an embodiment of this application.

FIG. 3 is a schematic structural diagram of a search space group switching apparatus according to an embodiment of this application. The apparatus may correspond to a terminal in other embodiments. As shown in FIG. 3, the apparatus 300 includes the following modules:

- a switching module 302 that can be configured to switch between at least two search space groups; and
- a PDCCH monitoring module 304 that can be configured to perform corresponding PDCCH monitoring based on the switched-to search space group; where the at least two search space groups include search space group #2, search space group #2 being not linked to any search space or a first search space, the first search space including at least one of a first type common search space CSS, a UE specific search space USS, and a CSS other than the first type CSS.

In the search space group switching apparatus provided in this embodiment of this application, introducing search space group #2 can implement more flexible and diverse PDCCH monitoring. In the case that search space group #2 is not linked to any search space, switching to search space group #2 can implement PDCCH skipping, thereby achieving the purpose of energy saving. In the case that search space group #2 is not linked to the first search space, switching to search space group #2 at least spares the need of monitoring the first search space, also facilitating energy saving.

In some embodiments, as an embodiment, the at least two search space groups further include search space group #0 and/or search space group #1; and the switching module 302 is configured for at least one of the following (1) and (2): (1) switching from search space group #0 to search space group #1; and (2) switching from search space group #0 to search space group #2.

In some embodiments, as an embodiment, the switching module 302 is configured for at least one of the following (1) and (2): (1) in a case that search space group #0 is being used and that an obtained first indication is a first value, switching from search space group #0 to search space group #1; and (2) in a case that search space group #0 is being used and that an obtained first indication is a second value, switching from search space group #0 to search space group #2, where the first indication is carried in first downlink control information DCI.

In some embodiments, as an embodiment, the first DCI further includes a second indication, where the second indication satisfies at least one of the following (1) and (2): (1) a preset indication field being used for the first indication in a case that the second indication obtained is a third value; and (2) a preset indication field being used for a preset indication in a case that the second indication obtained is a fourth value.

In some embodiments, as an embodiment, the switching module 302 is configured for at least one of the following (1) and (2): (1) in a case that the terminal is using search space group #0 and that a minimum available scheduling offset indicated by an obtained minimum available scheduling offset indication is equal to 0, switching from search space group #0 to search space group #1; and (2) in a case that the terminal is using search space group #0 and that a minimum available scheduling offset indicated by an obtained minimum available scheduling offset indication is greater than 0, switching from search space group #0 to search space group #2.

In some embodiments, as an embodiment, the at least two search space groups further include search space group #0 and/or search space group #1; and the switching module 302 is configured for at least one of the following (1) to (3): (1) switching from search space group #2 to search space group #0; (2) switching from search space group #2 to search space group #1; and (3) switching from search space group #2 to a default search space group, where the default search space group is any one of the at least two search space groups.

In some embodiments, as an embodiment, the switching from search space group #2 to search space group #0 or the switching from search space group #2 to a default search space group includes: in a case that the terminal is using search space group #2, switching from search space group #2 to search space group #0 or from search space group #2 to the default search space group after a first timer times out or after a first time interval has elapsed since a first timer times out.

In some embodiments, as an embodiment, the apparatus 300 further includes a control module configured to start or restart a first timer after switching to search space group #2 is completed; where the first timer is used for switching from search space group #2 to search space group #0 or from search space group #2 to a default search space group.

In some embodiments, as an embodiment, the switching module 302 is configured to: in a case that search space group #2 is being used and that second DCI is detected, perform at least one of the following (1) to (3): (1) switching from search space group #2 to search space group #0; (2) switching from search space group #2 to search space group #1; and (3) switching from search space group #2 to the default search space group.

In some embodiments, as an embodiment, the second DCI is scrambled with a specific radio network temporary identity RNTI; and/or; a search space carrying the second DCI is a specific type of search space.

In some embodiments, as an embodiment, the switching module 302 is further configured to determine, based on at least one of a network-side device configuration, a predefined rule, and the second DCI, to switch from search space group #2 to search space group #0 or from search space group #2 to search space group #1 or from search space group #2 to the default search space group.

In some embodiments, as an embodiment, the switching module 302 is further configured to continue using search space group #2 in a case that search space group #2 is being used and that third DCI is detected.

In some embodiments, as an embodiment, the third DCI is scrambled with a group common RNTI or broadcast RNTI.

In some embodiments, as an embodiment, the apparatus 300 further includes a control module configured to start or restart a first timer after the third DCI is detected; where the first timer is used for switching from search space group #2 to search space group #0 or from search space group #2 to the default search space group.

In some embodiments, as an embodiment, a network-side configuration or a protocol stipulates that the search space group switching apparatus 300 does not support direct switching between search space group #2 and search space group #1.

In some embodiments, as an embodiment, the counting unit of the first timer is: time slot, millisecond, or discontinuous reception DRX cycle.

In some embodiments, as an embodiment, the switching module 302 is configured to switch a search space group of a target cell group between the at least two search space groups based on target information; where the target information includes at least one of the following: a secondary cell dormancy or non-dormancy indication, and a secondary cell activation or deactivation indication; and the target cell group is a cell group other than a cell group to which a cell indicated by the target information belongs.

In some embodiments, as an embodiment, the at least two search space groups further include search space group #0 and/or search space group #1; and in a case that the target information includes a secondary cell non-dormancy indication or a secondary cell activation indication, the switching module 302 is configured for at least one of the following (1) and (2): (1) switching a search space group of a cell group that is in the target cell group and that is using search space group #2 to search space group #0 or search space group #1; and (2) switching a search space group of a cell group that is in the target cell group and that is using search space group #0 to search space group #1.

In some embodiments, as an embodiment, the at least two search space groups further include search space group #0 and/or search space group #1; and in a case that the target information includes a secondary cell dormancy indication or a secondary cell deactivation indication, the switching module 302 is configured for at least one of the following (1) and (2): (1) switching a search space group of a cell group that is in the target cell group and that is using search space group #1 to search space group #0 or search space group #2; and (2) switching a search space group of a cell group that is in the target cell group and that is using search space group #0 to search space group #2.

In some embodiments, as an embodiment, the switching module 302 is configured to switch a search space group of the target cell group between the at least two search space groups based on the target information in a case that no DCI is detected during operation of a second timer.

For the apparatus 300 according to this embodiment of this application, reference may be made to the processes of the method 200 in the corresponding embodiment of this application, and the units/modules of the apparatus 300 and other operations and/or functions described above are respectively intended to implement the corresponding processes in the method 200, with the same or equivalent technical effects achieved. For brevity, details are not described herein again.

The search space group switching apparatus in this embodiment of this application may be a terminal, or may be a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine or the like, which are not specifically limited in the embodiments of this application.

The search space group switching apparatus in this embodiment of this application may be an apparatus with an operating system. The operating system may be an android operating system, an iOS operating system, or other possible operating systems. This is not specifically limited in the embodiments of this application.

The search space group switching apparatus provided in this embodiment of this application can implement the processes implemented in the method embodiment in FIG. 2, with the same technical effects achieved. To avoid repetition, details are not described herein again.

Figure 4:
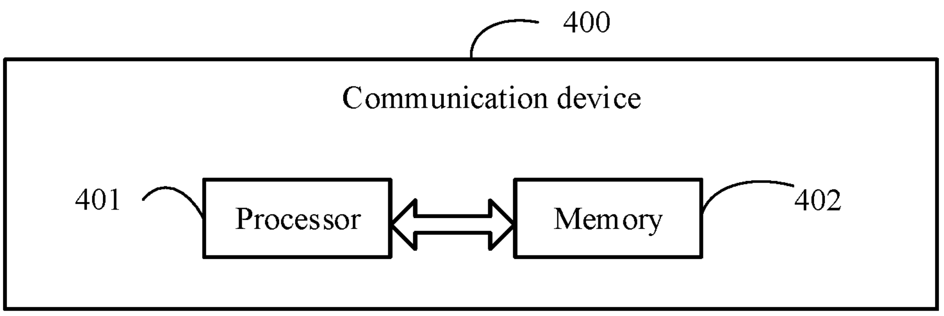
FIG. 4 is a schematic structural diagram of a communication device according to an embodiment of this application.

In some embodiments, as shown in FIG. 4, an embodiment of this application further provides a communication device 400 including a processor 401, a memory 402, and a program or instructions stored in the memory 402 and capable of running on the processor 401. For example, in a case that the communication device 400 is a terminal, when the program or instructions are executed by the processor 401, the processes of the foregoing embodiment of the search space group switching method are implemented, with the same technical effects achieved.

Figure 5:
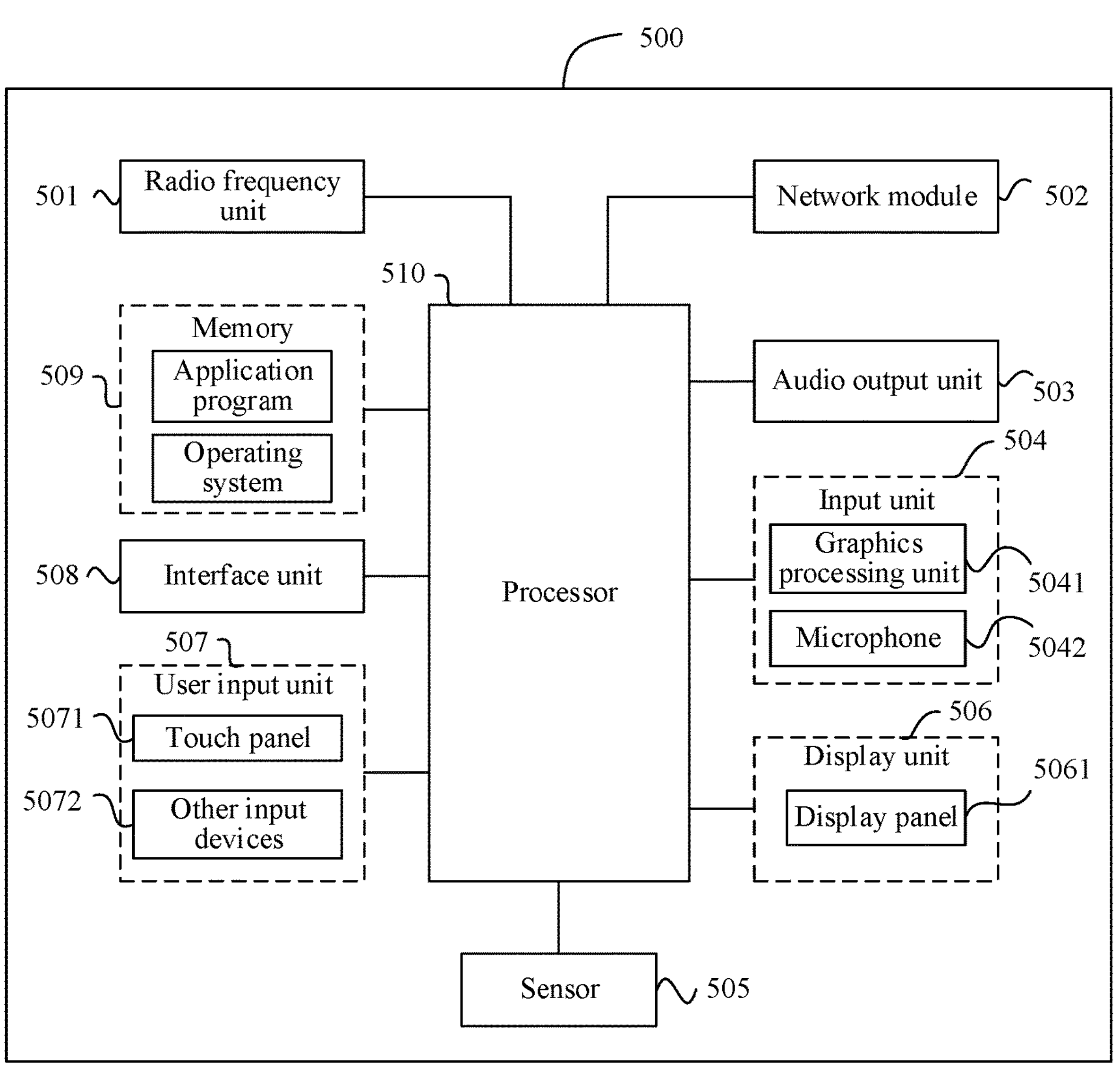
FIG. 5 is a schematic structural diagram of a terminal according to an embodiment of this application.

FIG. 5 is a schematic diagram of a hardware structure of a terminal for implementing the embodiments of this application.

The terminal 500 includes but is not limited to components such as a radio frequency unit 501, a network module 502, an audio output unit 503, an input unit 504, a sensor 505, a display unit 506, a user input unit 507, an interface unit 508, a memory 509, and a processor 510.

It can be understood by those skilled in the art that the terminal 500 may further include a power supply (for example, a battery) supplying power to the components. The power supply may be logically connected to the processor 510 via a power management system, so that functions such as charge management, discharge management, and power consumption management are implemented by using the power management system. The structure of the terminal shown in FIG. 5 does not constitute any limitation on the terminal, and the terminal may include more or fewer components than shown in the figure, or combine some of the components, or have different arrangements of the components. Details are not described herein.

It should be understood that in this embodiment of this application, the input unit 504 may include a graphics processing unit (GPU) 5041 and a microphone 5042. The graphics processing unit 5041 processes image data of a static picture or a video that is obtained by an image capture apparatus (for example, a camera) in an image capture mode or a video capture mode. The display unit 506 may include a display panel 5061. The display panel 5061 may be configured in a form of a liquid crystal display, an organic light-emitting diode display, or the like. The user input unit 507 includes a touch panel 5071 and other input devices 5072. The touch panel 5071 is also referred to as a touch-screen. The touch panel 5071 may include two parts: a touch detection apparatus and a touch controller. The other input devices 5072 may include but are not limited to a physical keyboard, a functional button (such as a volume control button or a power on/off button), a trackball, a mouse, and a joystick. Details are not described herein again.

In this embodiment of this application, the radio frequency unit 501 transmits downlink data received from a network-side device to the processor 510 for processing, and in addition, transmits uplink data to the network-side device. Generally, the radio frequency unit 501 includes but is not limited to an antenna, at least one amplifier, a transceiver, a coupler, a low noise amplifier, a duplexer, and the like.

The memory 509 may be configured to store software programs or instructions and various data. The memory 509 may include a program or instruction storage area and a data storage area. The program or instruction storage area may store an operating system, an application program or instructions required by at least one function (for example, sound play function or image play function), and the like. In addition, the memory 509 may include a high-speed random access memory, and may further include a non-volatile memory, where the non-volatile memory may be a read-only memory (ROM), a programmable read-only memory (PROM), an erasable programmable read-only memory (EPROM), an electrically erasable programmable read-only memory (EEPROM), or a flash memory. for example, at least one disk storage device, flash memory device, or other volatile solid-state storage device.

The processor 510 may include one or more processing units. In some embodiments, the processor 510 may integrate an application processor and a modem processor. The application processor mainly processes an operating system, a user interface, application programs or instructions, and the like. The modem processor mainly processes wireless communication, for example, being a baseband processor. It can be understood that the modem processor may alternatively be not integrated in the processor 510.

The processor 510 is configured to switch between at least two search space groups; and the radio frequency unit 501 is configured to perform corresponding physical downlink control channel PDCCH monitoring based on a switched-to search space group; where the at least two search space groups include search space group #2, search space group #2 being not linked to any search space or a first search space, the first search space including at least one of a first type common search space CSS, a UE specific search space USS, and a CSS other than the first type CSS.

In this embodiment of this application, introducing search space group #2 can implement more flexible and diverse PDCCH monitoring. In the case that search space group #2 is not linked to any search space, the terminal switching to search space group #2 can implement PDCCH skipping, thereby achieving the purpose of terminal energy saving. In the case that search space group #2 is not linked to the first search space and that the terminal switches to search space group #2, at least the first search space does not need to be monitored, also facilitating terminal energy saving.

The terminal 500 provided in this embodiment of this application can further implement the processes of the search space group switching method embodiment, with the same technical effects achieved. To avoid repetition, details are not described herein again.

An embodiment of this application further provides a readable storage medium, where a program or instructions are stored in the readable storage medium. When the program or instructions are executed by a processor, the processes of the foregoing embodiment of the search space group switching method are implemented, with the same technical effects achieved. To avoid repetition, details are not described herein again.

The processor may be a processor in the terminal described in the foregoing embodiment. The readable storage medium includes a computer-readable storage medium, such as a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions to implement the processes of the foregoing embodiments of the search space group switching method, with the same technical effects achieved. To avoid repetition, details are not described herein again.

It should be understood that the chip mentioned in this embodiment of this application may also be referred to as a system-level chip, a system chip, a chip system, a system-on-chip, or the like.

It should be noted that the terms "include", "comprise", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more constraints, an element preceded by "includes a . . . " does not preclude the presence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

From the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific embodiments. These specific embodiments are merely for illustration rather than limitation. Inspired by this application, persons of ordinary skill in the art may develop many other forms without departing from the essence of this application and the protection scope of the claims, and all such forms shall fall within the protection scope of this application.

What is claimed is:

1. A search space group switching method applied to a terminal, wherein the method comprises:

switching between at least two search space groups; and performing corresponding physical downlink control channel PDCCH monitoring based on a switched-to search space group; wherein the at least two search space groups comprise search space group #2, search space group #2 being not linked to a first search space, the first search space comprising a CSS other than a first type CSS, wherein the first type CSS is a type 3 CSS;

wherein the at least two search space groups further comprise search space group #0 and search space group #1; and the switching between at least two search space groups comprises:

switching from search space group #2 to search space group #0;

wherein the switching from search space group #2 to search space group #0 comprises:

switching from search space group #2 to search space group #0 after a first timer times out or after a first time interval has elapsed since a first timer times out.

2. The method according to claim 1, wherein the switching between at least two search space groups further comprises at least one of the following:

switching from search space group #0 to search space group #1; and switching from search space group #0 to search space group #2;

switching from search space group #2 to search space group #1; and switching from search space group #2 to a default search space group, wherein the default search space group is any one of the at least two search space groups.

3. The method according to claim 2, wherein the switching from search space group #0 to search space group #1, or the switching from search space group #0 to search space group #2, comprises at least one of the following:

switching from search space group #0 to search space group #1 in a case that the terminal is using search space group #0 and that an obtained first indication is a first value; and switching from search space group #0 to search space group #2 in a case that the terminal is using search space group #0 and that an obtained first indication is a second value; wherein the first indication is carried in first downlink control information DCI.

4. The method according to claim 3, wherein the first DCI further comprises a second indication, and the second indication satisfies at least one of the following:

a preset indication field being used for the first indication in a case that the second indication obtained is a third value; and a preset indication field being used for a preset indication in a case that the second indication obtained is a fourth value.

5. The method according to claim 2, wherein the switching from search space group #0 to search space group #1, or the switching from search space group #0 to search space group #2, comprises at least one of the following:

switching from search space group #0 to search space group #1 in a case that the terminal is using search space group #0 and that a minimum available scheduling offset indicated by an obtained minimum available scheduling offset indication is equal to 0; and switching from search space group #0 to search space group #2 in a case that the terminal is using search space group #0 and that a minimum available scheduling offset indicated by an obtained minimum available scheduling offset indication is greater than 0.

6. The method according to claim 2, wherein the method further comprises: starting or restarting the first timer after switching to search space group #2; wherein the first timer is used for switching from search space group #2 to search space group #0.

7. The method according to claim 2, wherein the switching from search space group #2 to search space group #1, or switching from search space group #2 to a default search space group, comprises:

performing at least one of the following in a case that the terminal is using search space group #2 and that second DCI is detected:

switching from search space group #2 to search space group #1; and switching from search space group #2 to the default search space group.

8. The method according to claim 7, wherein the second DCI is scrambled with a specific radio network temporary identity RNTI; and/or a search space carrying the second DCI is a specific type of search space;

or, wherein the method further comprises: determining, based on at least one of a network-side device configuration, a predefined rule, and the second DCI, to switch from search space group #2 to search space group #1 or from search space group #2 to the default search space group;

or, wherein the method further comprises: continuing using search space group #2 in a case that the terminal is using search space group #2 and that third DCI is detected.

9. The method according to claim 8, wherein the third DCI is scrambled with a group common RNTI or a broadcast RNTI;

or, wherein the method further comprises:

starting or restarting the first timer after the third DCI is detected; wherein the first timer is used for switching from search space group #2 to search space group #0 or from search space group #2 to a default search space group.

10. The method according to claim 2, wherein a network-side configuration or a protocol stipulates that the terminal does not support direct switching between search space group #2 and search space group #1.

11. A terminal, comprising a processor, a memory, and a program or instructions stored in the memory and capable of running on the processor, wherein the program or instructions are executed by the processor to perform:

switching between at least two search space groups; and performing corresponding physical downlink control channel PDCCH monitoring based on a switched-to search space group; wherein the at least two search space groups comprise search space group #2, search space group #2 being not linked to a first search space, the first search space comprising a CSS other than a first type CSS, wherein the first type CSS is a type 3 CSS;

wherein the at least two search space groups further comprise search space group #0 and search space group #1; and the switching between at least two search space groups comprises:

switching from search space group #2 to search space group #0;

wherein the switching from search space group #2 to search space group #0 comprises:

switching from search space group #2 to search space group #0 after a first timer times out or after a first time interval has elapsed since a first timer times out.

12. The terminal according to claim 11, wherein when switching between at least two search space groups, the program or instructions are executed by the processor to further perform at least one of the following:

switching from search space group #0 to search space group #1; and switching from search space group #0 to search space group #2;

switching from search space group #2 to search space group #1; and switching from search space group #2 to a default search space group, wherein the default search space group is any one of the at least two search space groups.

13. The terminal according to claim 12, wherein when switching from search space group #0 to search space group #1, or switching from search space group #0 to search space group #2, the program or instructions are executed by the processor to perform at least one of the following:

switching from search space group #0 to search space group #1 in a case that the terminal is using search space group #0 and that an obtained first indication is a first value; and switching from search space group #0 to search space group #2 in a case that the terminal is using search space group #0 and that an obtained first indication is a second value; wherein the first indication is carried in first downlink control information DCI.

14. The terminal according to claim 13, wherein the first DCI further comprises a second indication, and the second indication satisfies at least one of the following:

a preset indication field being used for the first indication in a case that the second indication obtained is a third value; and a preset indication field being used for a preset indication in a case that the second indication obtained is a fourth value.

15. The terminal according to claim 12, wherein when switching from search space group #0 to search space group #1, or the switching from search space group #0 to search space group #2, the program or instructions are executed by the processor to perform at least one of the following:

switching from search space group #0 to search space group #1 in a case that the terminal is using search space group #0 and that a minimum available scheduling offset indicated by an obtained minimum available scheduling offset indication is equal to 0; and switching from search space group #0 to search space group #2 in a case that the terminal is using search space group #0 and that a minimum available scheduling offset indicated by an obtained minimum available scheduling offset indication is greater than 0.

16. The terminal according to claim 12, wherein the program or instructions are executed by the processor to perform: starting or restarting the first timer after switching to search space group #2; wherein the first timer is used for switching from search space group #2 to search space group #0.

17. The terminal according to claim 12, wherein when switching from search space group #2 to search space group #1, or switching from search space group #2 to a default search space group, the program or instructions are executed by the processor to perform:

performing at least one of the following in a case that the terminal is using search space group #2 and that second DCI is detected:

switching from search space group #2 to search space group #1; and switching from search space group #2 to the default search space group.

18. A non-transitory readable storage medium, wherein the readable storage medium stores a program or instructions, and the program or instructions are executed by a processor to perform:

switching between at least two search space groups; and performing corresponding physical downlink control channel PDCCH monitoring based on a switched-to search space group; wherein the at least two search space groups comprise search space group #2, search space group #2 being not linked to a first search space, the first search space comprising a CSS other than a first type CSS, wherein the first type CSS is a type 3 CSS;

wherein the at least two search space groups further comprise search space group #0 and search space group #1; and the switching between at least two search space groups comprises:

switching from search space group #2 to search space group #0;

wherein the switching from search space group #2 to search space group #0 comprises:

switching from search space group #2 to search space group #0 after a first timer times out or after a first time interval has elapsed since a first timer times out.

19. The non-transitory readable storage medium according to claim 18, wherein when switching between at least two search space groups, the program or instructions are executed by the processor to further perform at least one of the following:

switching from search space group #0 to search space group #1; and switching from search space group #0 to search space group #2;

switching from search space group #2 to search space group #1; and switching from search space group #2 to a default search space group, wherein the default search space group is any one of the at least two search space groups.

20. The non-transitory readable storage medium according to claim 19, wherein when switching from search space group #0 to search space group #1, or switching from search space group #0 to search space group #2, the program or instructions are executed by the processor to perform at least one of the following:

switching from search space group #0 to search space group #1 in a case that the terminal is using search space group #0 and that an obtained first indication is a first value; and switching from search space group #0 to search space group #2 in a case that the terminal is using search space group #0 and that an obtained first indication is a second value; wherein the first indication is carried in first downlink control information DCI.

* * * * *